US012490847B2

(12) United States Patent
Jiang et al.

(10) Patent No.: US 12,490,847 B2
(45) Date of Patent: Dec. 9, 2025

(54) OUTDOOR CAMPING MAT

(71) Applicant: ZHEJIANG HUAYANG LEISURE PRODUCTS CO., LTD., Wenling (CN)

(72) Inventors: Huiming Jiang, Wenling (CN); Chenglong Lin, Hangzhou (CN)

(73) Assignee: ZHEJIANG HUAYANG LEISURE PRODUCTS CO., LTD., Wenling (CN)

(*) Notice: Subject to any disclaimer, the term of this patent is extended or adjusted under 35 U.S.C. 154(b) by 232 days.

(21) Appl. No.: 18/349,330

(22) Filed: Jul. 10, 2023

(65) Prior Publication Data

US 2024/0164554 A1 May 23, 2024

(30) Foreign Application Priority Data

Nov. 23, 2022 (CN) ......................... 202223108818.4

(51) Int. Cl.
*A47G 9/06* (2006.01)
*A01M 29/12* (2011.01)

(52) U.S. Cl.
CPC ............. *A47G 9/062* (2013.01); *A01M 29/12* (2013.01); *A47G 2200/08* (2013.01)

(58) Field of Classification Search
CPC ............ A47G 2009/001; A47G 9/0207; A47G 2200/08; A47G 9/062; A47G 9/10; A47G 9/1009; A47G 9/086; A47G 9/08; A47G 2400/10; A47G 27/0237; A45F 3/22; A45F 3/52; A45F 4/00; A45F 3/24; A45F 3/46; A45F 4/08; A45F 2003/001; A41D 13/001; A01K 13/006; A01M 29/34; A01M 29/12; A47C 31/006; A47C 1/146; Y02A 50/30; E04H 15/56; E04H 15/04; E04H 15/02; A63B 21/4037; B32B 27/12; A47B 3/10
USPC ................................. 5/413 R, 419, 655, 420
See application file for complete search history.

(56) References Cited

U.S. PATENT DOCUMENTS

2022/0211187 A1* 7/2022 Harrison ................ D04H 3/045

FOREIGN PATENT DOCUMENTS

| | | | | | |
|---|---|---|---|---|---|
| CN | 203034212 U | * | 7/2013 | | |
| CN | 204861728 U | | 12/2015 | | |
| CN | 208160339 U | * | 11/2018 | | |
| CN | 210809704 U | | 6/2020 | | |
| CN | 217598041 U | * | 10/2022 | | |
| KR | 20170100955 A | * | 9/2017 | ............. | D03D 11/02 |

* cited by examiner

*Primary Examiner* — Madison Emanski
(74) *Attorney, Agent, or Firm* — Nitin Kaushik

(57) ABSTRACT

The present invention relates to an outdoor camping mat, which comprises: A woven mat body, woven by plastic woven strips; A protective structure, set at the surrounding edges of the woven mat body to hold the woven mat body; A functional layer, wrapped around the outside of the plastic woven strips to enable the woven mat body to store energy when being exposed to light, emit light, and/or repel mosquitoes. The present invention can achieve energy storage and emit light, effectively repel mosquitoes, has strong applicability, and can effectively avoid loosening at the edges of the woven mat body. The present invention can be widely applied in the field of woven mats.

9 Claims, 4 Drawing Sheets

OUTDOOR CAMPING MAT

CROSS-REFERENCE TO RELATED APPLICATIONS

The application claims priority to Chinese patent application No. 202223108818.4, filed on Nov. 23, 2022, the entire contents of which are incorporated herein by reference.

TECHNICAL FIELD

The present invention relates to the field of woven mat technology, in particular to an outdoor camping mat.

BACKGROUND

Most of the existing woven mats are woven from bamboo, which has the disadvantages of low strength and easy damage. In order to enhance the strength of the woven mat, many manufacturers have made improvements to the structure of the woven mat. For example, reinforced ropes are used to make the woven mat to enhance its strength and structural stability. However, the surface of the improved woven mat is no different from that of traditional woven mats. When it is used outdoors, its applicability is poor, especially in the case of darkness, where the woven mat is not easily discovered.

SUMMARY

In response to the above problems, the purpose of the present invention is to provide an outdoor camping mat that can store energy and emit light, effectively repel mosquitoes, has strong applicability, and effectively avoids looseness at the edges of the woven mat body.

To achieve the above purpose, the present invention adopts the following technical solution: an outdoor camping mat, which comprises: A woven mat body, woven by plastic woven strips; A protective structure, set at the surrounding edges of the woven mat body to hold the woven mat body; A functional layer, wrapped around the outside of the plastic woven strips to enable the woven mat body to store energy when being exposed to light, emit light, and/or repel mosquitoes.

Furthermore, the functional layer is a light-emitting layer; The light-emitting layer is a fluorescent coating; The fluorescent coating is uniformly coated on the plastic woven strips of the woven mat body, and is integrally formed with the plastic woven strip.

Furthermore, the functional layer is a mosquito repellent layer; The mosquito repellent layer is an oil-based mosquito repellent layer; The mosquito repellent layer is uniformly wrapped on the plastic woven strip of the woven mat body, and is integrally formed with the plastic woven strip.

Furthermore, the plastic woven strip adopts a plastic hollow tube structure.

Furthermore, the protective structure and the woven mat body adopt an integrated structure.

Furthermore, the edge of the woven mat body is bent from top to bottom to form a bending portion, which is fixed with the woven mat body to form the protective structure.

Furthermore, the edge of the woven mat body is directly formed by hot pressing, forming the protective structure that is integrally formed with the woven mat body.

Furthermore, the protective structure and the woven mat body adopt a split structure.

Furthermore, the protective structure comprises an upper protective edge and a side protective edge; The upper protective edge is set at the left and right ends of the woven mat body, and the side protective edge is set at the upper and lower ends of the woven mat body; The upper protective edge and the side protective edge both wrap around the edge of the woven mat body and are fixedly connected to the woven mat body.

Furthermore, the upper protective edge and the side protective edge are sewn onto the woven mat body through braided threads.

The present invention has the following advantages due to the adoption of the above technical solutions:

1. The woven mat body of the present invention is woven with plastic woven strips, and the woven mat body is fixed by a protective layer, to effectively avoids loosening at the edges of the woven mat body.
2. The woven mat body of the present invention emits light at night through the light-emitting layer, which facilitates the outdoor use of the woven mat and enhances its aesthetics.
3. The woven mat body of the present invention can effectively repel mosquitoes through a mosquito repellent layer, which makes it convenient for the woven mat to be used outdoors, especially in places where there are more mosquitoes in summer.

The other advantages, objectives and features of the present invention will be embodied in part by the following description, and in part will also be understood by those skilled in the art through the research and practice of the present invention.

KEY ON THE DRAWINGS

1. Woven mat body; 2. Protective structure; 3. Warp woven strip; 4. Weft woven strip; 5. Functional layer; 6. Upper protective edge; 7. Side protection edge

DETAILED DESCRIPTION OF THE EMBODIMENTS

In order to clarify the purpose, technical solution and advantages of the embodiments of the present invention, the following will provide a clear and complete description of the technical solution of the embodiments of the present invention in conjunction with the accompanying drawings. Obviously, the described embodiments are a partial embodiment of the present invention, rather than the entire embodiment. Based on the described embodiments of the present invention, all other embodiments obtained by ordinary technical personnel in the art fall within the scope of protection of the present invention.

It should be noted that the terms used herein are intended to describe specific embodiments only and are not intended to limit exemplary embodiments according to the present application. As used herein, unless the context explicitly indicates otherwise, the singular form is also intended to include the plural form, and it is further understood that when the terms "comprising" and/or "including" are used in this specification, they indicate the presence of features, steps, operations, devices, components, and/or combinations thereof.

In order to solve the problem of poor adaptability of existing woven mats, the present invention provides an outdoor camping mat, which comprises: A woven mat body, woven by plastic woven strips; A protective layer, set at the surrounding edges of the woven mat body to hold the woven mat body; A light-emitting layer, wrapped around the outside of the plastic woven strips to enable the woven mat body To emit light under sunlight. The present invention can achieve energy storage and emit light, has strong applicability, and can effectively avoids loosening at the edges of the woven mat body.

Figure 1:
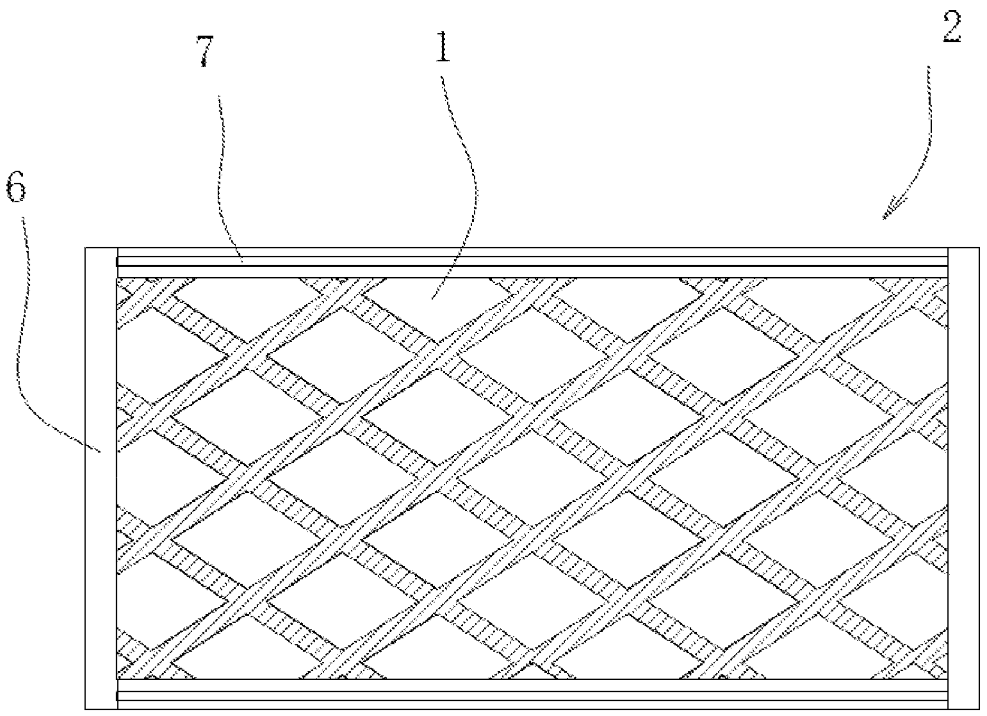
FIG. 1 shows a schematic diagram of the structure of an outdoor camping mat in one embodiment of the present invention.
Figure 2:
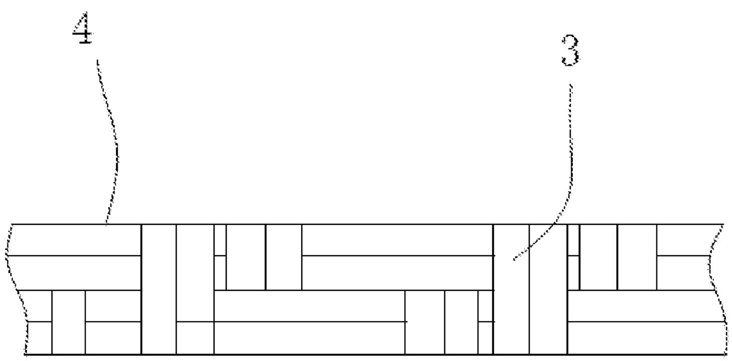
FIG. 2 shows an enlarged view of the structure of the woven mat body in one embodiment of the present invention.

In one embodiment of the present invention, an outdoor camping mat is provided. In this embodiment, as shown in FIGS. 1 and 2, the outdoor camping mat comprises:

A woven mat body 1, woven by plastic woven strips;

A protective structure 2, set at the surrounding edges of the woven mat body 1 to hold the woven mat body 1 and prevent loosening at the edges of the woven mat body 1;

A functional layer 5, wrapped around the outside of the plastic woven strips to enable the woven mat body 1 to store energy when being exposed to light, emit light, and/or repel mosquitoes.

When in use, the woven mat body 1 formed by plastic woven strips is fixed by the protective structure 2, to avoid loosening at the edges of the woven mat body 1. Meanwhile, the woven mat body 1 emits light under sunlight and/or effectively repels mosquitoes, making it convenient for outdoor use and improving its aesthetics.

In the above embodiments, the plastic woven strip is made of polyester fiber or other plastic materials, and adopts a hollow tube structure. The polyester fiber has the advantages of solid, durable, and good elastic recovery.

In this embodiment, the plastic woven strips of the woven mat body 1 comprises warp woven strips 3 and weft woven strips 4, with warp woven strips 3 and weft woven strips 4 woven in a staggered pattern.

Figure 3:
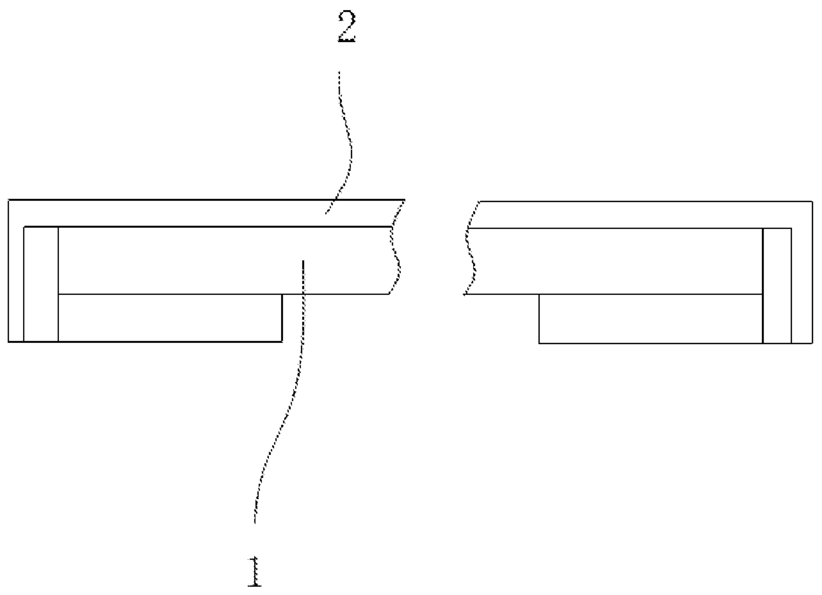
FIG. 3 shows a schematic diagram of the integrated structure of the protective layer in one embodiment of the present invention.

In a preferred embodiment, the protective structure 2 is integrally formed with the woven mat body 1, as shown in FIG. 3.

Specifically, the protective structure 2 is formed by the edges of the woven mat body 1. The edge of the woven mat body 1 is bent from top to bottom to form a bend that covers the edge of the lower surface of the woven mat body 1, and the bend is pressed or sewn to the woven mat body 1 to form the protective structure 2.

In this embodiment, the woven edge of the woven mat body 1 is optimized to make the edge of the woven mat body 1 smoother and more beautiful, and to prevent the warp woven strips 3 and the weft woven strips 4 in the woven mat body 1 from being loosely separated.

In this embodiment, the protective structure 2 can also be formed by direct hot pressing at the edge of the woven mat body 1, which is integrally formed with the woven mat body 1.

Figure 4:
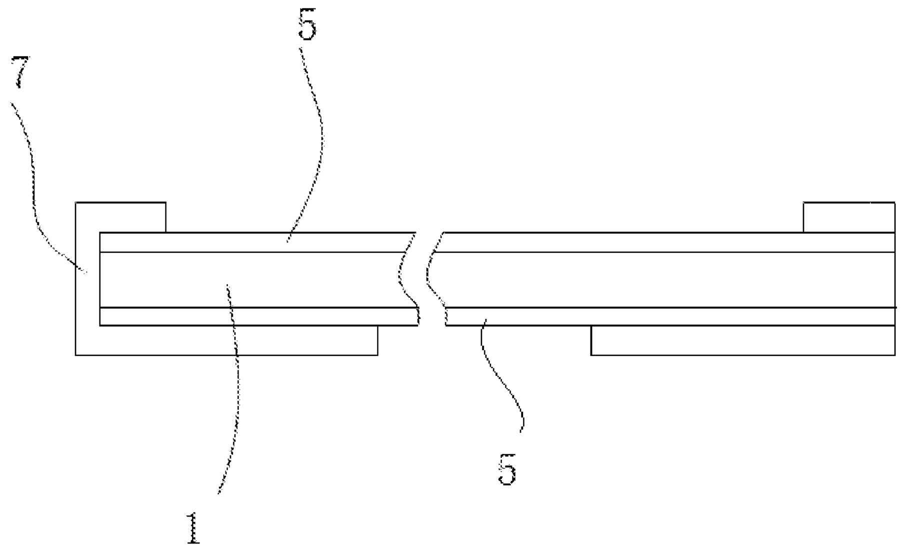
FIG. 4 shows a schematic diagram of the split structure of the protective layer in one embodiment of the present invention.

In a preferred embodiment, as shown in FIGS. 1 and 4, the protective structure 2 and the woven mat body 1 adopt a split structure.

Specifically, the protective structure 2 comprises an upper protective edge 6 and a side protective edge 7. The upper protective edge 6 is set at the left and right ends of the woven mat body 1, and the side protective edge 7 is set at the upper and lower ends of the woven mat body 1 (as shown in FIG. 1). Both the upper protective edge 6 and the side protective edge 7 wrap up around the edge of the woven mat body 1 and are fixedly connected to the woven mat body 1.

In this embodiment, the upper protective edge 6 and the side protective edge 7 are sewn to the woven mat body 1 by means of braided threads, and both the upper protective edge 6 and the side protective edge 7 are made of cotton or plastic materials.

When in use, the four edges of the woven mat body 1 are sewn together with cotton or plastic protective edges, so that the edges are wrapped around the protective edges, effectively improving the overall performance of the woven mat body 1.

In the above embodiment, the functional layer 5 is a light-emitting layer and/or a mosquito repellent layer. Wherein, the light-emitting layer is preferably a fluorescent coating. The fluorescent coating is uniformly applied to the plastic woven strips of the woven mat body 1, which are integrally formed with the plastic woven strips.

Wherein, the fluorescent coating is made of fluorescent powder; Fluorescent powder, commonly known as luminous powder, is usually divided into two categories: photoinduced energy storage luminous powder and radioactive luminous powder. Photoinduced energy storage luminous powder is a fluorescent powder that stores light energy when being exposed to natural light, sunlight, ultraviolet light, etc. After stopping the light exposure, it is slowly released in a fluorescent manner. Therefore, luminescence can still be seen at night or in dark places, lasting for several to ten hours. Those skilled in this field should understand that fluorescent powder is an existing material.

In this embodiment, the woven mat body 1 with a light-emitting layer made of plastic woven strips slowly emits light after illumination, and the light emits for a longer period of time.

The mosquito repellent layer is preferably an oil-based mosquito repellent layer. The mosquito repellent layer is evenly wrapped on the plastic woven strips of the woven mat body 1, and is integrally formed with the plastic woven strips. Wherein, the oil-based mosquito repellent layer is made of YSAI-601, an oil-based mosquito repellent microcapsule; The oil-based mosquito repellent microcapsule YSAI-601 has a rapid knockdown and killing effect on mosquitoes, lice, fleas, etc., and the repellent rate of *Aedes albopictus* is more than 90%; After multiple washes, it still has good mosquito prevention effect. It should be understood by those skilled in the art that the oil-based mosquito repellent microcapsule YSAI-601 used in this embodiment is an existing material.

In summary, in the use of the present invention, the woven mat body 1 is woven by the warp woven strips 3 and the weft woven strips 4 in a staggered pattern, and the finished woven mat body 1 is fixed by the protective structure 2 to prevent the problem of looseness at the edges of the woven mat body 1. Meanwhile, the woven mat body

1. emits light at night through the light-emitting layer and/or effectively repels mosquitoes through the mosquito repellent layer, which facilitates the outdoor use of the woven mat and enhances the aesthetics.

Finally, it should be noted that the above embodiments are only used to illustrate the technical solution of the present invention, not to limit it; despite the detailed description of the present invention with reference to the foregoing embodiments, it should be understood by those of ordinary skill in the art that it is still possible to modify the technical solution recorded in the foregoing embodiments, or to make equivalent substitutions for some of the technical features thereof; and these modifications or substitutions do not make the essence of the corresponding technical solution depart from the spirit and scope of the technical solution of the various embodiments of the present invention. For example, the terms woven mat body, protective layer, light-emitting layer, warp woven strips, weft woven strips, fluorescent coating, upper protective edge, and side protective edge are more frequently used in each of the above embodiments, but the possibility of using other terms is not excluded. These terms are used only to describe and explain the essence of the present invention more easily, and it would be contrary to the spirit of the present invention to interpret them as any kind of additional limitation.

What is claimed is:

1. An outdoor camping mat, characterized in that it comprises: a woven mat body (1), woven by plastic woven strips; a protective structure (2), set at surrounding edges of the woven mat body (1) to hold the woven mat body (1); a functional layer (5), wrapped around an outside of the plastic woven strips to enable the woven mat body (1) to store energy when being exposed to light, emit light, and/or repel mosquitoes, the functional layer (5) is a light-emitting layer; the light-emitting layer is a fluorescent coating; the fluorescent coating is uniformly coated on the plastic woven strip of the woven mat body (1), and is integrally formed with the plastic woven strip.

2. The outdoor camping mat of claim 1, characterized in that, the functional layer (5) is a mosquito repellent layer; the mosquito repellent layer is an oil-based mosquito repellent layer; the mosquito repellent layer is uniformly wrapped on the plastic woven strips of the woven mat body (1), and is integrally formed with the plastic woven strip.

3. The outdoor camping mat of claim 1, characterized in that, the plastic woven strip adopts a plastic hollow tube structure.

4. The outdoor camping mat of claim 1, characterized in that, the protective structure (2) and the woven mat body (1) adopt an integrated structure.

5. The outdoor camping mat of claim 4, characterized in that, the surrounding edges of the woven mat body (1) are bent from top to bottom to form a bending portion, which are fixed with the woven mat body (1) to form the protective structure (2).

6. The outdoor camping mat of claim 4, characterized in that, the surrounding edges of the woven mat body (1) are directly formed by hot pressing, forming the protective structure (2) that is integrally formed with the woven mat body (1).

7. The outdoor camping mat of claim 1, characterized in that, the protective structure (2) and the woven mat body (1) adopt a split structure.

8. The outdoor camping mat of claim 7, characterized in that, the protective structure (2) comprises an upper protective edge (6) and a side protective edge (7);

the upper protective edge (6) is set at the left and right ends of the woven mat body (1), and the side protective edge (7) is set at the upper and lower ends of the woven mat body (1);

both the upper protective edge (6) and the side protective edge (7) wrap up around the edge of the woven mat body (1) and are fixedly connected to the woven mat body (1).

9. The outdoor camping mat of claim 8, characterized in that, the upper protective edge (6) and the side protective edge (7) are sewn onto the woven mat body (1) through braided threads.

* * * * *